(12) United States Patent
McIntire et al.

(10) Patent No.: US 10,669,102 B2
(45) Date of Patent: Jun. 2, 2020

(54) CONVEYOR AXLE RETAINER

(71) Applicant: Intelligrated Headquarters, LLC, Mason, OH (US)

(72) Inventors: Ryan McIntire, Mason, OH (US); Cody Dawson, Oakley, OH (US); Justin Brouk, Cincinnati, OH (US); Walter Hammond, Monroe, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/947,007

(22) Filed: Apr. 6, 2018

(65) Prior Publication Data

US 2019/0308818 A1    Oct. 10, 2019

(51) Int. Cl.
| | | |
|---|---|---|
| *B65G 17/24* | (2006.01) | |
| *B65G 21/06* | (2006.01) | |
| *B65G 47/26* | (2006.01) | |
| *F16B 2/22* | (2006.01) | |

(52) U.S. Cl.
CPC ............. *B65G 17/24* (2013.01); *B65G 21/06* (2013.01); *B65G 47/268* (2013.01); *F16B 2/22* (2013.01); *B65G 2201/02* (2013.01)

(58) Field of Classification Search
None
See application file for complete search history.

(56) References Cited

U.S. PATENT DOCUMENTS

| | | | |
|---|---|---|---|
| 6,692,000 B2* | 2/2004 | Borne | ..................... F16C 33/08 193/35 R |
| 6,811,018 B2 | 11/2004 | Cotter et al. | |
| 7,093,709 B2 | 8/2006 | Cotter et al. | |
| 7,467,708 B2 | 12/2008 | Mcgettigan et al. | |
| 7,556,144 B2 | 7/2009 | Cotter | |
| 7,806,254 B2 | 10/2010 | Brayman et al. | |
| 8,196,737 B2 | 6/2012 | Brayman et al. | |
| 8,272,504 B2* | 9/2012 | Neugebauer | ......... B65G 19/025 198/867.15 |
| 8,469,178 B2* | 6/2013 | Butler | .................. B65G 47/766 198/457.06 |
| 2007/0108026 A1 | 5/2007 | McGettigan | |

(Continued)

FOREIGN PATENT DOCUMENTS

| | | |
|---|---|---|
| JP | 2001-080717 A | 3/2001 |
| WO | 2000/078648 A1 | 12/2000 |

*Primary Examiner* — Kavel Singh
(74) *Attorney, Agent, or Firm* — Alston & Bird LLP

(57) ABSTRACT

The present disclosure relates to an axle retainer and associated conveyor system. An example axle retainer is defined by a housing that includes a first surface configured to be secured to an inner-sidewall of a conveyor frame and a second surface opposite the first surface. The second surface defines two or more apertures configured to mount a conveyor roller axle therein. Each aperture includes a snap-fit bracket defining two arms each with a corresponding protrusion. The two arms of the snap-fit bracket are configured to expand from a first position to a second position within the aperture to receive a conveyor roller axle and rebut from the second position to the first position such that the pair of corresponding protrusions defined by the two arms of the snap-fit bracket retain the conveyor roller axle in the aperture.

18 Claims, 7 Drawing Sheets

(56) References Cited

U.S. PATENT DOCUMENTS

2008/0073185 A1    3/2008   Brayman et al.
2010/0243412 A1    9/2010   Brayman et al.
2012/0125735 A1    5/2012   Schuitema et al.

\* cited by examiner

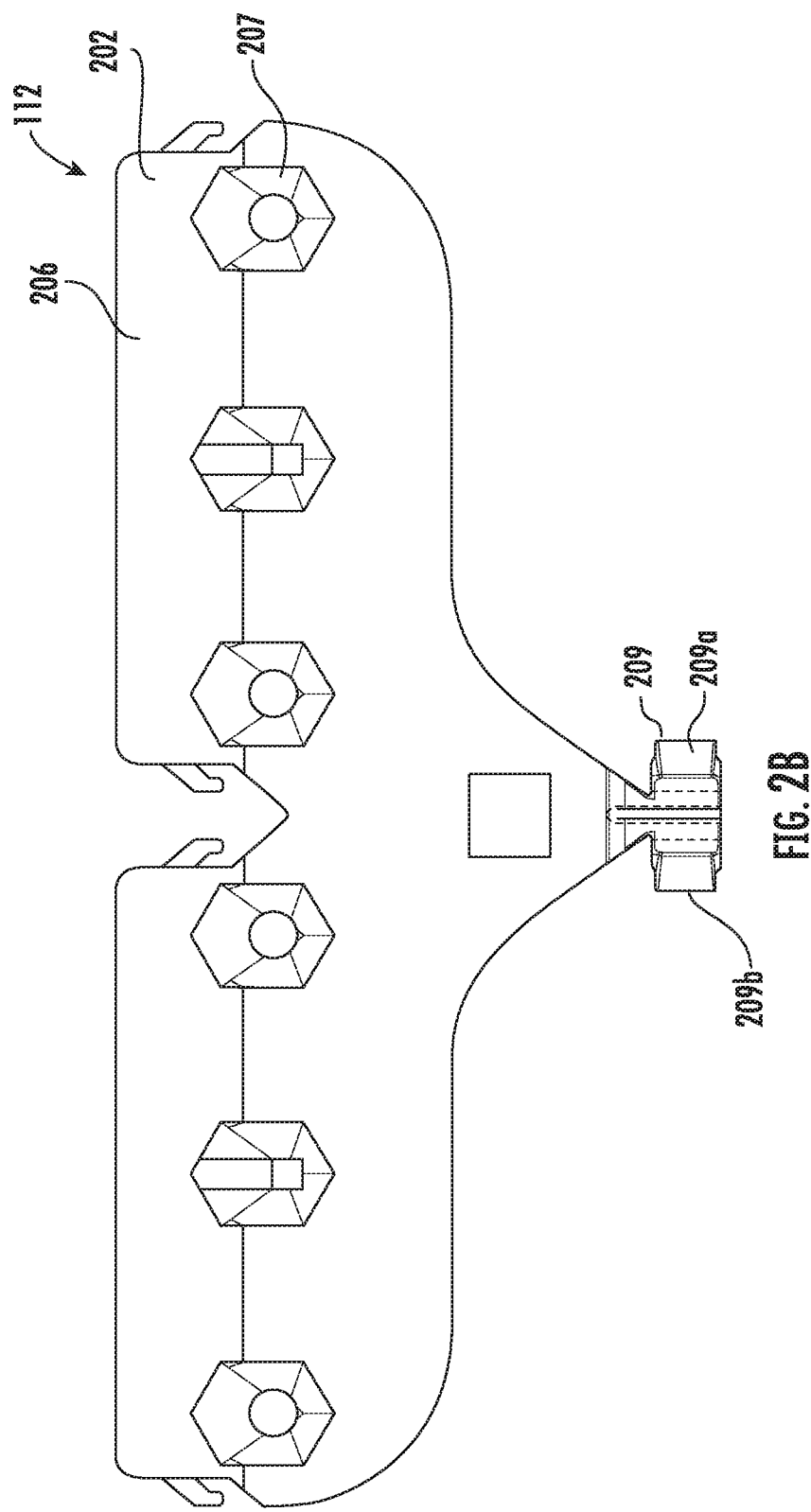

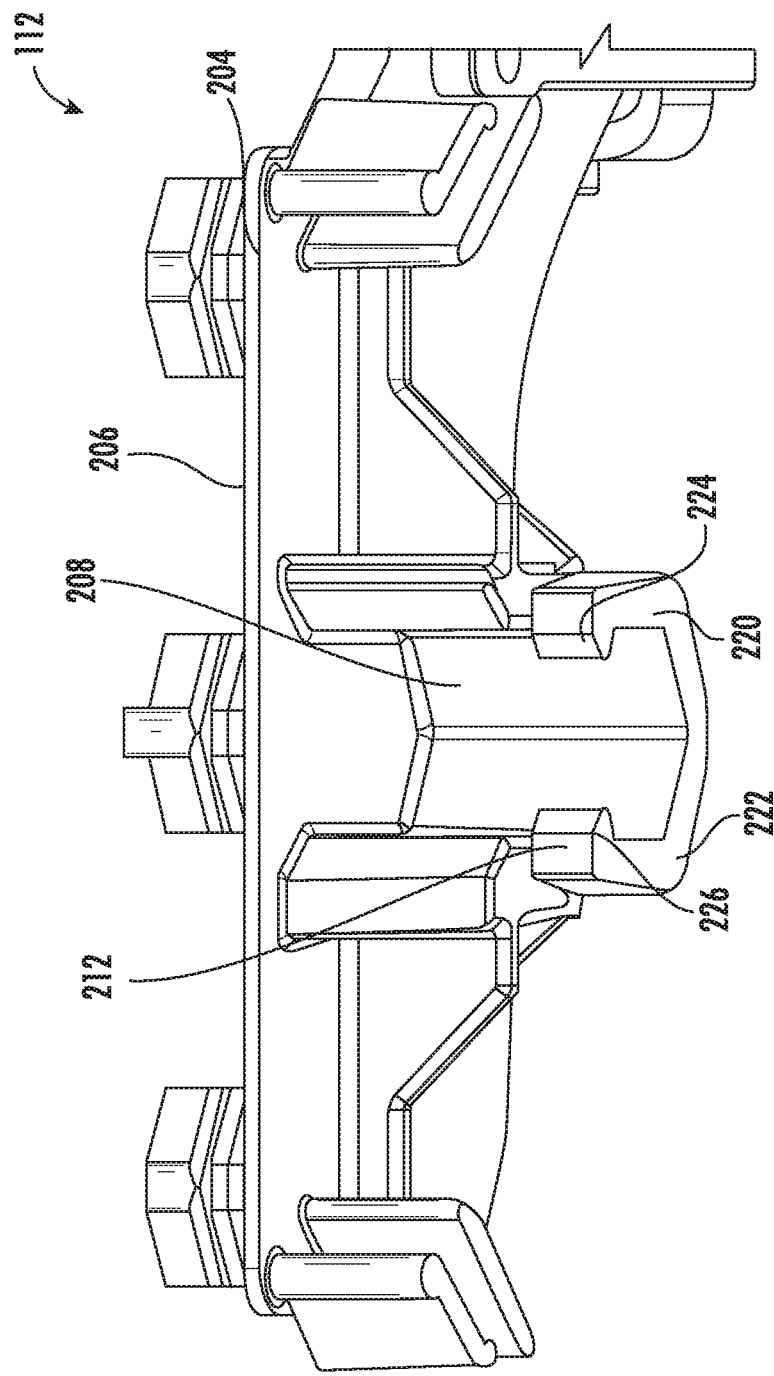

CONVEYOR AXLE RETAINER

TECHNOLOGICAL FIELD

Example embodiments of the present invention relate generally to material handling systems and, more particularly, to retainers for use with conveyor systems.

BACKGROUND

Material handling systems are traditionally used to convey, sort, and organize items (e.g., cartons, cases, etc.) at high speeds. Depending on the configuration of the system, the items may travel through the system in an unregulated manner or may be consolidated into a single stream of items. Conveyor systems may rely on a conveyor controller and/or warehouse management system to organize items through all stages of handling and processing.

Conventional conveyor systems may also include a conveyor bed and multiple conveyor carriers in the form of rollers or belts supported on a conveyor frame of the conveyor bed. The multiple conveyor carriers are often used for supporting and transporting items within the material handling system. An example conveyor system may include a sorter conveyor system, a merge conveyor system, an accumulation conveyor system, an induction conveyor system, or the like. These conveyor systems are often divided into zones with each zone including a set of motorized and/or idler rollers that each include an axle coupled to the conveyor frame. The set of motorized and/or idler rollers are often overrun by an endless conveyor belt. The conveyor belts may be driven by the set of motorized and idler rollers to accumulate articles on each zone, to move articles in the direction of travel, and/or to discharge articles into neighboring zones or discharge stations.

Applicant has identified several technical challenges associated with coupling conveyor rollers to conveyor frames. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed conveyor system. This summary is not an extensive overview and is intended to neither identify key or critical elements nor delineate the scope of such elements. Its purpose is to present some concepts of the described features in a simplified form as a prelude to the more detailed description that is presented later.

Embodiments of the present disclosure provide a retaining mechanism for coupling a conveyor roller axle to a conveyor frame. According to at least one aspect of the present disclosure, an axle retainer is provided. The axle retainer may be defined by a housing having a first surface secured to an inner-sidewall of a conveyor frame and a second surface opposite the first surface. The second surface may include two or more apertures that mount a conveyor roller axle therein. The aperture may have a snap-fit bracket defining two arms each with a corresponding protrusion. The two arms of the snap-fit bracket may expand from a first position to a second position within the aperture to receive a conveyor roller axle and rebut from the second position to the first position such that the pair of corresponding protrusions defined by the two arms of the snap-fit bracket retain the conveyor roller axle in the aperture.

According to one or more embodiments of the present disclosure, the axle retainer may have a plurality of locking hooks on the first surface of the housing. The locking hooks may recess on groove seats at the inner-sidewall of the conveyor frame.

According to one or more embodiments of the present disclosure, the axle retainer may have an inverted hook on the first surface of the housing. The inverted hook may be inserted within a hook groove at the inner-sidewall of the conveyor frame.

According to one or more embodiments of the present disclosure, the first surface of the axle retainer may be clamped between two ends of adjacent conveyor zones defined by one or more frame-walls of a conveyor frame.

According to one or more embodiments of the present disclosure, the two arms of the snap fit bracket may expand from the first position to the second position within the aperture for dismounting the conveyor roller axle from the aperture and rebut to the first position from the second position in an instance in which the conveyor roller axle is dismounted from the aperture.

According to one or more embodiments of the present disclosure, the two arms of the snap-fit bracket in the first position may prevent mounting of the conveyor roller axle within the aperture, and the two arms of the snap-fit bracket in the second position may allow mounting of the conveyor roller axle within the aperture.

According to one or more embodiments of the present disclosure, the second surface of the housing may include channel for receiving a transition plate.

According to one or more embodiments of the present disclosure, the two or more apertures may have a plurality of supporting arms disposed below the snap-fit bracket for supporting the conveyor roller axles to be mounted on the two or more apertures.

According to another aspect of the present disclosure, a conveyor system is provided. The conveyor system may include a conveyor frame having a first frame-wall and a second frame-wall. The conveyor system may further include a first axle retainer to be secured to an inner side-wall of the first frame-wall and a second axle retainer to be secured opposite to the first axle retainer on an inner side-wall of the second frame-wall. The first axle retainer and the second axle retainer may mount a plurality of conveyor roller axles between the first frame-wall and the second frame-wall. Further, each of the first axle retainer and the second axle retainer may include a housing. The housing may include two or more apertures having a snap-fit bracket defining two arms with a corresponding protrusion. The two arms of the snap-fit bracket may expand from a first position to a second position within the aperture to receive a conveyor roller axle and may rebut from the second position to the first position such that the pair of corresponding protrusions defined by the two arms of the snap-fit bracket retain the conveyor roller axle in the aperture.

According to one or more embodiments of the present disclosure, the conveyor frame may be divided into a plurality of conveyor zones, each conveyor zone having a set of conveyor rollers mounted between the first frame-wall and the second frame-wall of the conveyor frame and a conveyor belt reeved over the set of conveyor rollers.

According to one or more embodiments of the present disclosure, the first axle retainer or the second axle retainer may be clamped between two ends of adjacent conveyor zones on the first frame-wall or the second frame-wall of the conveyor frame.

According to one or more embodiments of the present disclosure, the first frame-wall and the second frame-wall of the conveyor frame may have a plurality of groove seats to engage with a plurality of locking hooks of the first axle retainer or the second axle retainer for securing the first axle retainer or the second axle retainer on the first frame-wall or the second frame-wall, respectively.

According to one or more embodiments of the present disclosure, the first frame-wall or the second frame-wall of the conveyor frame may have a hook groove configured to receive an inverted hook of the first axle retainer or the second axle retainer for securing the first axle retainer or the second axle retainer on the first frame-wall or the second frame-wall, respectively.

According to another aspect of the present disclosure, a method for securing an axle retainer is provided. The method may include securing a first surface of an axle retainer to an inner-sidewall of a conveyor frame. The method may further include mounting a conveyor roller axle of a conveyor roller to a second surface opposite the first surface of the axle retainer. The second surface of the axle retainer may have two or more apertures having a snap-fit bracket defining two arms each with a corresponding protrusion. Further, mounting the conveyor roller axle may include expanding the two arms of the snap-fit bracket from a first position to a second position within the aperture to receive a conveyor roller axle, and rebutting the two arms of the snap-fit bracket from the second position to a first position such that the corresponding protrusions defined by the two arms of the snap-fit bracket retain the conveyor roller axle in the aperture.

According to one or more embodiments of the present disclosure, securing the axle retainer on the inner-sidewall of the conveyor frame may include securing locking hooks formed on the first surface of the axle retainer to groove seats formed on the inner-sidewall of the conveyor frame.

According to one or more embodiments of the present disclosure, the method may further include disengaging a conveyor roller secured to the axle retainer by dismounting a proximal axle of the conveyor roller from a first aperture of a first axle retainer and dismounting a distal axle of the conveyor roller from a second aperture of a second axle retainer. Further, the two arms of the snap-fit brackets of the first axle retainer and the second axle retainer may be expanded from the first position to the second position to release the proximal axle and the distal axle from the first axle retainer and the second axle retainer.

According to one or more embodiments of the present disclosure, the conveyor roller may correspond to an end roller in a conveyor zone, and the method may further include disengaging the conveyor roller from a first frame-wall and a second frame-wall of the conveyor frame, upon detection of a malfunctioning of the conveyor zone having the conveyor roller.

According to one or more embodiments of the present disclosure, disengaging the conveyor roller may include unreeving a conveyor belt of the conveyor zone and dismounting the conveyor roller from a first aperture of a first axle retainer secured to a first frame-wall and a second aperture of a second axle retainer secured to a second frame-wall of the conveyor frame.

According to one or more embodiments of the present disclosure, dismounting the conveyor roller may include pulling the conveyor roller perpendicular with respect to a direction of transport.

According to one or more embodiments of the present disclosure, securing the axle retainer to the conveyor frame may include clamping the axle retainer on the inner-sidewall of the conveyor frame between two ends of adjacent conveyor zones from the plurality of conveyor zones along the conveyor frame.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2B illustrates a back view of the axle retainer in accordance with one or more embodiments of the present disclosure;

FIG. 3 illustrates a perspective view of the axle retainer in accordance with one or more embodiments of the present disclosure;

DETAILED DESCRIPTION

Figure 1A:
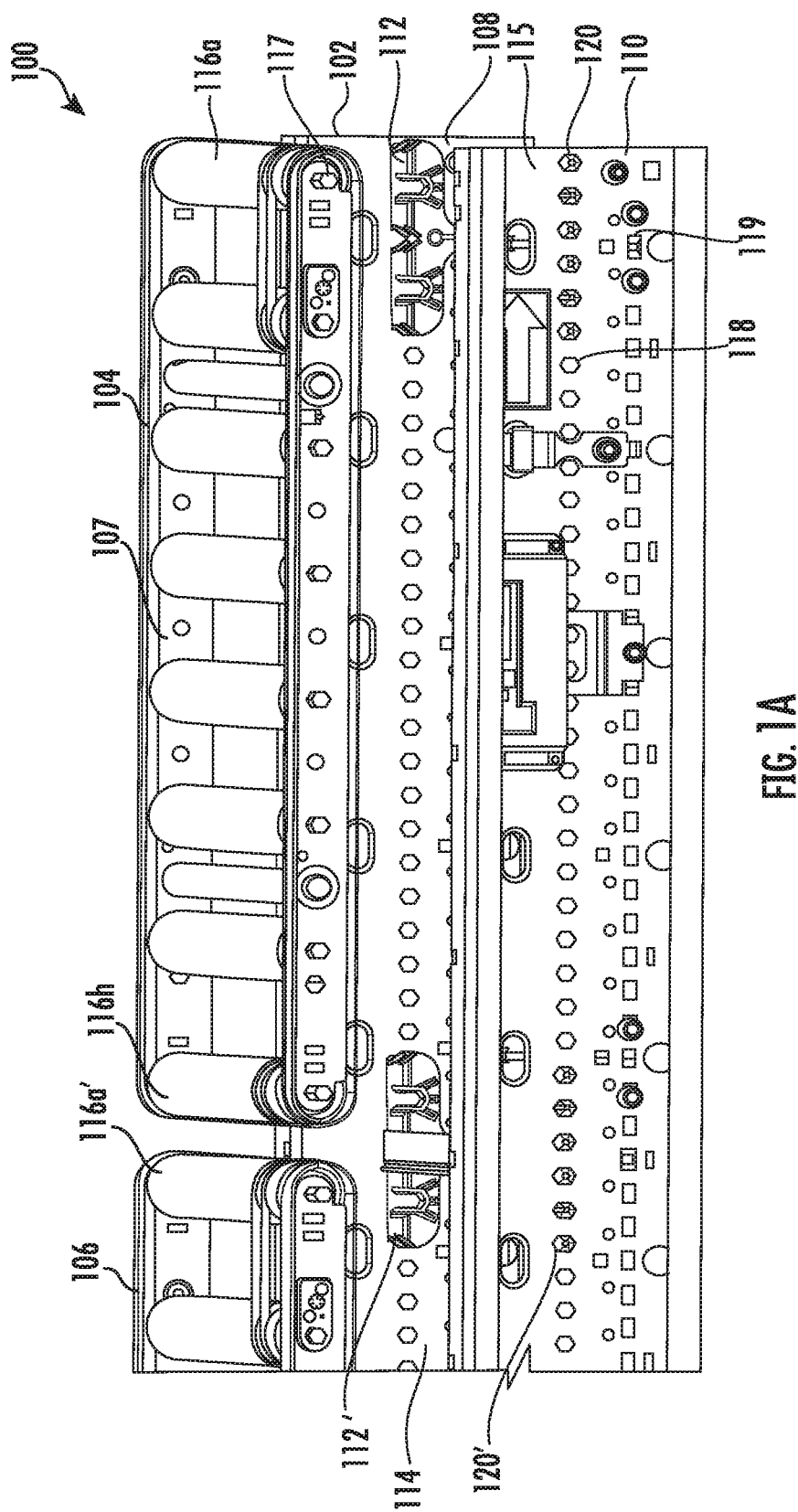
FIG. 1A illustrates a side perspective view of a conveyor system in accordance with an embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

In conventional conveyor systems, a conveyor bed may be divided into multiple conveyor zones, and each conveyor zone may have a set of conveyor rollers and a belt reeved around the set of conveyor rollers. Each conveyor zone may be driven and controlled individually by a controller or a warehouse management system to accumulate, divert, and/or convey articles. However, in conventional conveyor systems, each conveyor roller in a conveyor zone is coupled directly to the conveyor frame. For example, the conveyor system may have two spaced apart frame-walls or sides that support the conveyor rollers extending transversely between the frame-walls. Frame-walls may be supported by legs. Further, conveyor rollers are generally supported at each end by a hex shaped axle, each of which may engage a complimentary shaped opening formed in frame-walls. Accordingly, conveyor rollers are rotatably supported by the axle such that the shape of the openings in frame-walls prevents rotation of the axles.

In this regard, however, when a conveyor roller and/or a conveyor belt of a conveyor zone fails, the conveyor roller and/or the conveyor belt of that conveyor zone may need to be replaced or repaired. For example, when the conveyor rollers and/or the conveyor belts handle heavy loads, excessive stress may prematurely wear the conveyor roller and/or a conveyor belt. In such an example, when a conveyor roller and/or the conveyor belt needs to be replaced, each of the conveyor rollers coupled individually to the conveyor frame needs to be removed by pulling the conveyor belt out of contact with the conveyor rollers and detaching each conveyor roller separately. In this way, conventional systems require lengthy maintenance times that result in increased downtime of the conveyor system and decreased productivity of the material handling system.

Further, a clip may be used to couple a conveyor roller to the conveyor frame. Conventional clips that attach a conveyor roller to the conveyor frame, however, are generally designed to handle the weight of a single conveyor roller such that a separate clip may be needed for each conveyor roller in a conveyor zone. This separate clip requirement increases the cost of installation of such a conveyor system. Moreover, when each conveyor roller in all conveyor zones is coupled directly to the conveyor frame, that is, there is no connection between the clips of adjacent zones, there may be misalignment in individual conveyor zones. Still further, conventional clips generally use a compression fit to engage a conveyor roller axle. That is, a clip attached to a frame-wall of the conveyor frame may include a section made of deformable material that may compress when one end axle of a conveyor roller is inserted into the clip to enable the other end axle of the conveyor roller to be inserted in another clip attached to the opposite frame-wall of the conveyor frame. The operation of these traditional clips is cumbersome do not allow for a conveyor roller to be inserted from the top of the conveyor bed into the clips in an efficient manner. This deficiency in conventional systems is more problematic if a group of conveyor rollers are to be attached to the conveyor frame together.

Through applied effort, ingenuity, and innovation, many of the above identified problems have been solved by developing solutions that are included in embodiments of the present disclosure, many examples of which are described in detail herein. The present disclosure relates to an axle retainer for a securing a conveyor roller axle to a conveyor frame. The axle retainer may be defined by a housing having a first surface secured to an inner-sidewall of the conveyor frame. The axle retainer further has a second surface opposite the first surface. The second surface may include two or more apertures to mount one or more conveyor roller axles therein. The aperture has a snap-fit bracket defining two arms each with a corresponding protrusion. The two arms of the snap-fit bracket may expand from a first position to a second position within the aperture to receive a conveyor roller axle, and rebut from the second position to the first position such that the pair of corresponding protrusions defined by the two arms of the snap-fit bracket retain the conveyor roller axle in the aperture. Thus, due to the snap-fit design of the axle retainer, one or more conveyor rollers may be inserted into the axle retainer from the top of the conveyor bed with ease thereby reducing the overall installation and/or repair time of a conveyor system.

Figure 1B:
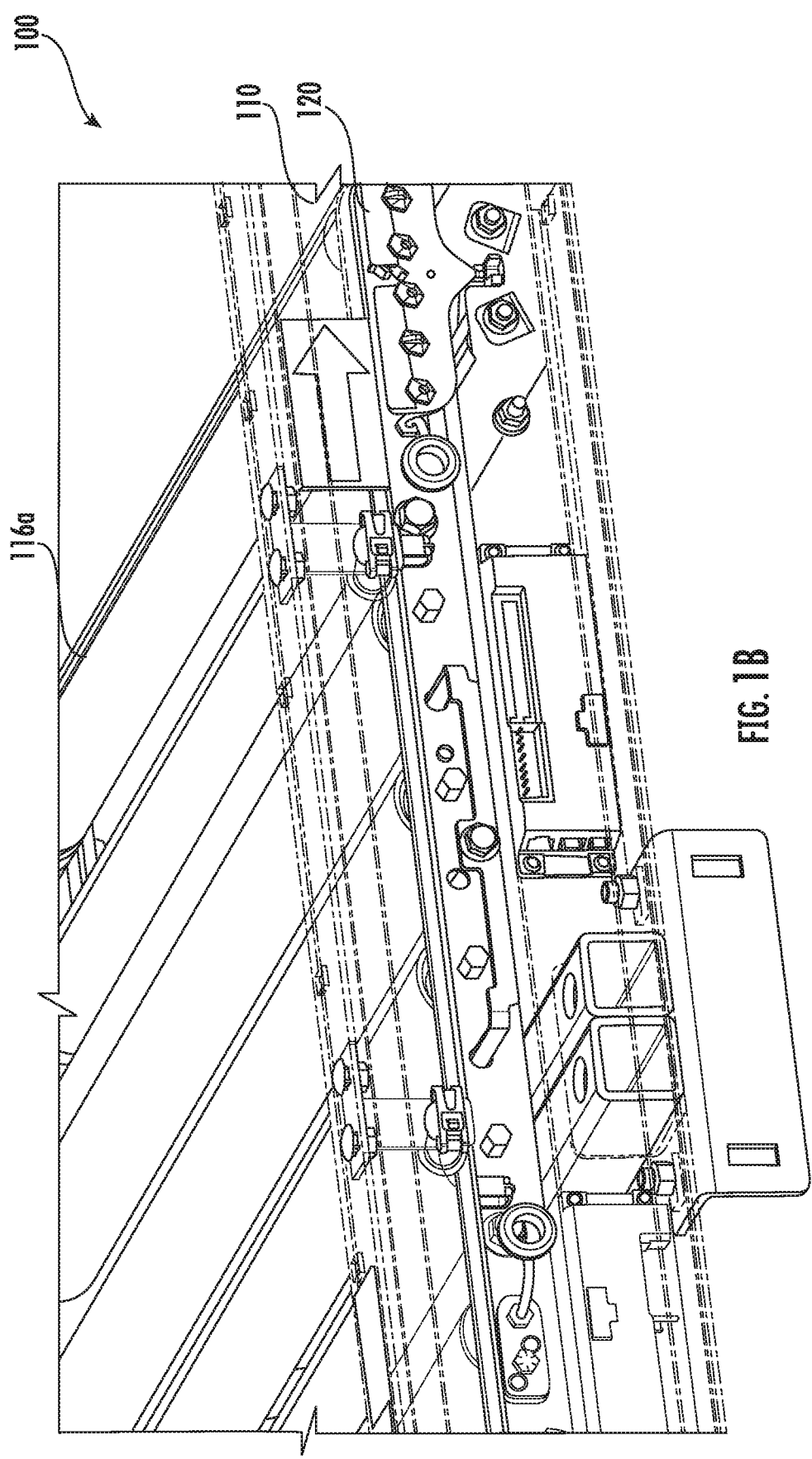
FIG. 1B illustrates a perspective view of the conveyor system in accordance with another embodiment of the present disclosure.

With reference to FIG. 1A and FIG. 1B perspective views of a conveyor system 100 is illustrated in accordance with one or more embodiments of the present disclosure. FIG. 1A shows a perspective view of the conveyor system 100 before attaching a plurality of conveyor rollers to a conveyor frame 102 of the conveyor system 100. The conveyor frame 102 has two spaced apart frame-walls 108 and 110 that support a plurality of conveyor rollers extending transversely between the frame-walls 108 and 110. Frame-walls 108 and 110 may, in some embodiments, be supported by legs (not shown). Conveyor system 100 may include a plurality of individually or centrally controllable conveyor zones, identified in FIGS. 1A and 1B as adjacent conveyor zones 104 and 106. Each conveyor zone 104 and 106 may include a set of conveyor rollers, shown in FIGS. 1A and 1B as conveyor rollers 116*a-h*, and a conveyor belt 107 reeved over the set of conveyor rollers 116*a-h*. Conveyor belt 107 may be a single, endless belt having an upper run portion that may support the articles conveyed on the conveyor system 100 and a lower run portion that may run under the set of conveyor rollers 116*a-h* in conveyor zone 104. Each conveyor zone 104 and 106 may have a drive assembly, such as motorized rollers, drive belts, and the like, for driving the set of conveyor rollers 116*a-h*. The set of conveyor rollers 116*a-h* in turn drive the conveyor belt 107 through friction drive. In other embodiments, conveyor belt 107 may be driven by a belt to belt contact with a drive belt (not shown) in a conveyor zone 104 and 106.

Further, as shown in FIGS. 1A and 1B, each conveyor zone 104 and 106 may have an end roller, such as conveyor roller 116*a*, having a conveyor roller axle 117 extending from the conveyor roller body. In an example embodiment, the conveyor roller axle 117 may be a hexagonal shaped metal rod that may be affixed to the conveyor frame 102 such that the conveyor roller axle 117 remains stationary when the conveyor roller 116*a* rotates. FIG. 1A illustrates a perspective view of the conveyor system 100 before affixing the conveyor roller axle 117 to the conveyor frame 102. FIG. 1B illustrates a perspective view of the conveyor system 100 after affixing the conveyor roller axle 117 to the conveyor frame 102.

Further, as shown in FIGS. 1A and 1B, the conveyor frame 102 includes spaced apart frame-walls 108 and 110. Each frame-wall 108 and 110 has an inner-sidewall, such as inner-sidewall 114 of frame-wall 108 facing inwards towards the opposite frame-wall 110. Each frame-wall 108 and 110 may further include an outer sidewall, such as outer sidewall 115 of frame-wall 110 facing outwards away from the opposite frame-wall 108. In accordance with one or more embodiments of the present disclosure, each frame-wall 108 and 110 may have connecting means, such as groove seats 118 and hook groove 119, as shown in FIGS. 1A and 1B for receiving an axle retainer 112. In accordance with one or more embodiments of the present disclosure, the axle retainer 112 acts as a clip for connecting a conveyor roller axle to the conveyor frame for ease of installation and removal of the conveyor roller, as needed. The axle retainer 112, as shown in FIGS. 1A and 1B, is attached to the inner-sidewall 114 of the frame-wall 108. Similarly, another axle retainer 120 is attached to the inner sidewall of the opposite frame-wall 110, and a further set of axle retainers 112' and 120' are attached to the frame-walls 108 and 110, as shown in FIG. 1A. The axle retainer 112 secures the conveyor roller axle 117 of the conveyor roller 116a to the frame-wall 108 of the conveyor frame 102, as opposed to attaching the conveyor roller 116a directly to the conveyor frame 102. The conveyor roller axle 117 is secured in an aperture of the axle retainer 112, as will be described later with reference to FIG. 2-4. Since the axle retainers 112, 120, 112', and 120' are designed to fit into groove seats 118 located throughout the length of the frame-walls 108 and 110, the axle retainers 112, 120, 112', and 120' may be attached at any location along the length of the frame-walls 108 and 110. In an embodiment, the axle retainers, such as axle retainer 112, may be used to clamp two adjacent conveyor rollers, such as conveyor rollers 116a and 116b, in a conveyor zone 104. In another embodiment, the axle retainers, such as axle retainer 112', may be attached between two adjacent zones in a conveyor frame 102, such that the axle retainers 112' secures end rollers of two adjacent conveyor zones, such as conveyor roller 116h of conveyor zone 104 and conveyor roller 116a' of conveyor zone 106, as shown in FIG. 1A. Thus, the axle retainer 112' may connect two adjacent conveyor zones 104 and 106 while operation and may provide better alignment and load distribution between the two conveyor zones 104 and 106.

Thus, during installation of the conveyor system 100, the axle retainers 112 and 120 may be secured to the frame-walls 108 and 110 of the conveyor frame 102, respectively. Further, the conveyor roller axles 117 and distal axle (not shown) of the conveyor roller 116a may be mounted to the axle retainers 112 and 120. In some embodiments, the conveyor roller 116a may be pushed downwards or popped into the axle retainers 112 and 120 from the top of the conveyor bed. Further, in some scenarios, the conveyor roller 116a may be dismounted or disengaged from the conveyor frame 102, such as on detection of malfunction within the conveyor roller 116a or the conveyor zone 104. For dismounting the conveyor roller 116a from the frame-walls 108 and 110, the conveyor roller axles 117 and the distal axle (not shown) may be pulled out from the axle retainers 112 and 120 by pulling the conveyor roller 116a upwards with respect to the conveyor frame 102 (e.g., in a direction substantially perpendicular to the direction of transport of the conveyor system 100). In some embodiments, dismounting the conveyor roller 116a may further include unreeving the conveyor belt 107 from the set of rollers 116a-h of the conveyor zone 104, and dismounting the conveyor roller 116a from the axle retainers 112 and 120, as described above.

With reference to FIG. 1B, a perspective view of the conveyor system 100 with the conveyor zone 104 attached to the conveyor frame 102 is illustrated. As shown in FIG. 1B, the conveyor roller 116a is attached to the conveyor frame 102 by securing the conveyor roller axle 117 (not shown) to the axle retainer 120 clamped on the frame-wall 110 of the conveyor frame 102.

Figure 2A:
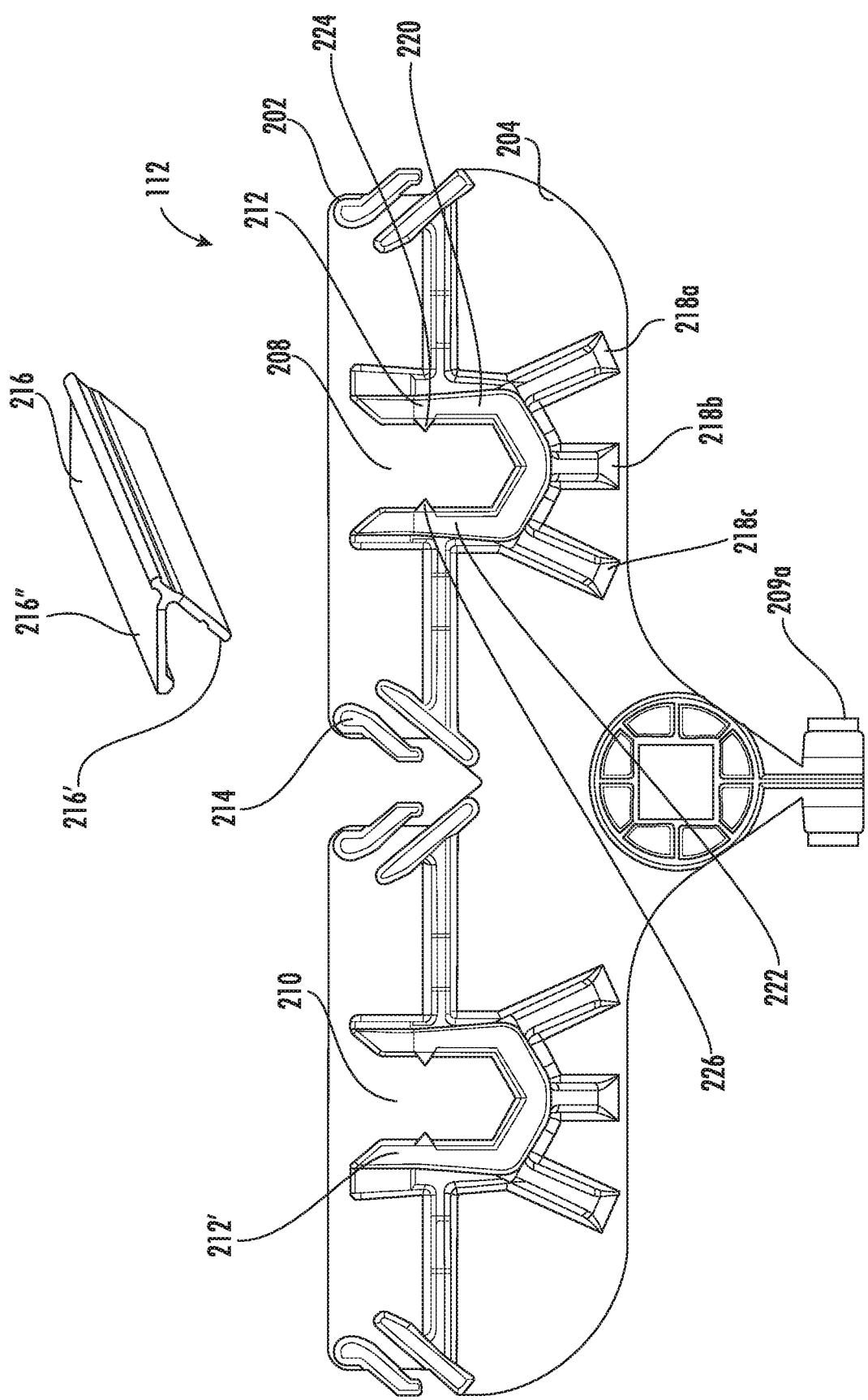
FIG. 2A illustrates a front view of an axle retainer in accordance with one or more embodiments of the present disclosure.

With reference to FIG. 2A a front view of the axle retainer 112 as shown in FIG. 1A, in accordance with one or more embodiments of the present disclosure is illustrated. The axle retainer 112 includes a housing 202 defining a front surface 204 and a back surface (not shown) opposite to the front surface 204. The front surface 204 of the axle retainer 112 faces the inner-sidewall of the opposite frame-wall 110 when the axle retainer 112 is attached to an inner-sidewall 114 of the frame-wall 108, as shown in FIG. 1A. The front surface 204 of the axle retainer 112 has two apertures 208 and 210 formed on the housing 202. The apertures 208 and 210 includes snap-fit brackets 212 and 212' for receiving conveyor roller axles to attach conveyor rollers to the conveyor frame 102. Each snap-fit bracket, such as the snap-fit bracket 212 has two arms 220, 222 each with a corresponding protrusion 224, 226, as shown in FIG. 2A. The snap-fit bracket 212 is described in detail below with reference to FIG. 3.

Further, the front surface 204 of the axle retainer 112 includes a plurality of support arms 218 provided under the aperture 208, as shown in FIG. 2A. The support arms 218 provide additional support to the aperture 208 to bear the weight of a single conveyor roller or an entire conveyor zone, as needed. The axle retainer 112 as shown in FIG. 2A has three support arms 218a disposed under the aperture 208 at one end of the aperture 208, 218b disposed under the aperture 208 at the center of the aperture 208, and 218c disposed under the aperture 208 at the opposite end of the aperture 208. Thus, the weight of a conveyor roller attached to the aperture 208 is equally distributed among the supports arms 218a-c. Further, the front surface 204 of the axle retainer 112 defines a plurality of channels, such as channel 214 for receiving a transition plate 216. The channel 214 includes a pair of parallel walls disposed on the upper portion of the front surface 204 and inclined at an angle, as shown in FIG. 2A. The transition plate 216 defines a corresponding inclined leg 216' that fits between the parallel walls of the channel 214. The transition plate 216 further has a body 216" attached to the inclined leg 216', such that the body 216" is parallel to the upper surface of the conveyor bed when the transition plate 216 is attached to the axle retainer 112. Thus, in some embodiments, the transition plate 216 forms a "7" like shape. The transition plate 216 may be used to cover or otherwise shield open spaces and/or moving parts between the frame-wall 108 and the axle retainer 112. The transition plate 216 may further provide protection against pinch hazard for an associated operator working on the conveyor frame 102 and/or any conveyed articles, such as polybags.

With reference to FIG. 2B, a back view of the axle retainer 112 as shown in FIG. 1A, in accordance with one or more embodiments of the present disclosure is illustrated. The housing 202 of the axle retainer 112 defines a back surface 206 that mates with the inner-sidewall of a frame-wall of the conveyor frame 102 to which the axle retainer 112 is attached. The back surface 206 includes a plurality of locking hooks 207 as shown in FIG. 2B. The locking hooks 207 may define a hex shaped protrusion that is received within a complimentary shaped groove, such as the groove seats 118 shown in FIG. 1A, in the frame-wall of the conveyor frame 102. The back surface 206 may further include an inverted hook 209 disposed at the bottom of the housing 202. The inverted hook 209 is received within a groove, such as the hook groove 119 shown in FIG. 1A, in the frame-wall of the conveyor frame 102. The inverted hook 209 may include protrusions or flaps 209a and 209b extending away from each other as shown in FIG. 2B. For attaching the axle retainer 112 to the frame-wall of the conveyor frame 102, the inverted hook 209 is inserted within the hook groove 119 such that the flaps 209a and 209b rest against the outer-sidewall of the frame-wall, as shown in FIGS. 1A and 1B. In such an embodiment, the flaps 209a and 209b may be made of a flexible material such that the flaps 209a and 209b may be pinched towards each other for passing the inverted hook 209 through the hook groove 119, and, once inserted, the flaps 209a and 209b may move away from each other in a resting position of the inverted hook 209, thereby retaining the inverted hook 209 on the frame-wall of the conveyor frame 102. In another embodiment, the flaps 209a and 209b may be rigid and may require inserted one after the other, at an angle, within the hook groove 119. Further, the locking hooks 207 of the axle retainer 112 may be recessed within the groove seats 118 of the frame-wall, as shown in FIGS. 1A and 1B. The inverted hook 209 and locking hooks 207 may operate to retain the axle retainer 112 on the frame-wall and prevent it from detaching during the operation of the conveyor system 100.

With reference to FIG. 3 a top view of the axle retainer 112, in accordance with one or more embodiments of the present disclosure is illustrated. The axle retainer 112 defines a housing 202 having a front surface 204 and a back surface 206 opposite to the front surface 204. As described above, the front surface 204 of the axle retainer 112 faces the inner-sidewall of the opposite frame-wall 110 when the axle retainer 112 is attached to an inner-sidewall 114 of the frame-wall 108, as shown in FIG. 1A. The front surface 204 of the axle retainer 112 defines an aperture 208 formed on the housing 202. The aperture 208 has a snap-fit bracket 212 for receiving a conveyor roller axle (not shown) to attach a conveyor roller to the conveyor frame 102. In an embodiment, the aperture 208 may have a shape corresponding to the shape of the conveyor roller axle. For example, for a hexagonal shaped conveyor roller axle, the aperture 208 may have an angled base and/or walls to receive the conveyor roller axle, as shown in FIG. 3.

Further, as shown in FIG. 3, the snap-fit bracket 212 may include two arms 220, 222 each with a corresponding protrusion 224, 226. The arms 220 and 222 may be formed of a flexible material such that the arms 220 and 222 may expand while mounting a conveyor roller axle within the aperture 208 and may rebut to a resting position to retain the mounted conveyor roller axle within the aperture 208. The two arms 220 and 222 may further expand while dismounting the conveyor roller axle from the aperture 208, and may rebut to the resting position when the conveyor roller axle is dismounted. The expanded and resting positions of the two arms 220 and 222 are described below with reference to FIG. 4A-4C. Further, when the conveyor roller axle is snapped into the snap-fit bracket 212, the two protrusions 224, 226 may grip the conveyor roller axle from the top, thus retaining the conveyor roller axle within the aperture 212 during the operation of the conveyor system 100. In some embodiments, the protrusions 224, 226 may secure the conveyor roller axle by each side, as opposed to the top of the roller axle, based on the height of the conveyor roller axle with respect to the depth of the aperture 208 and/or snap-fit bracket 212.

Figure 4A:
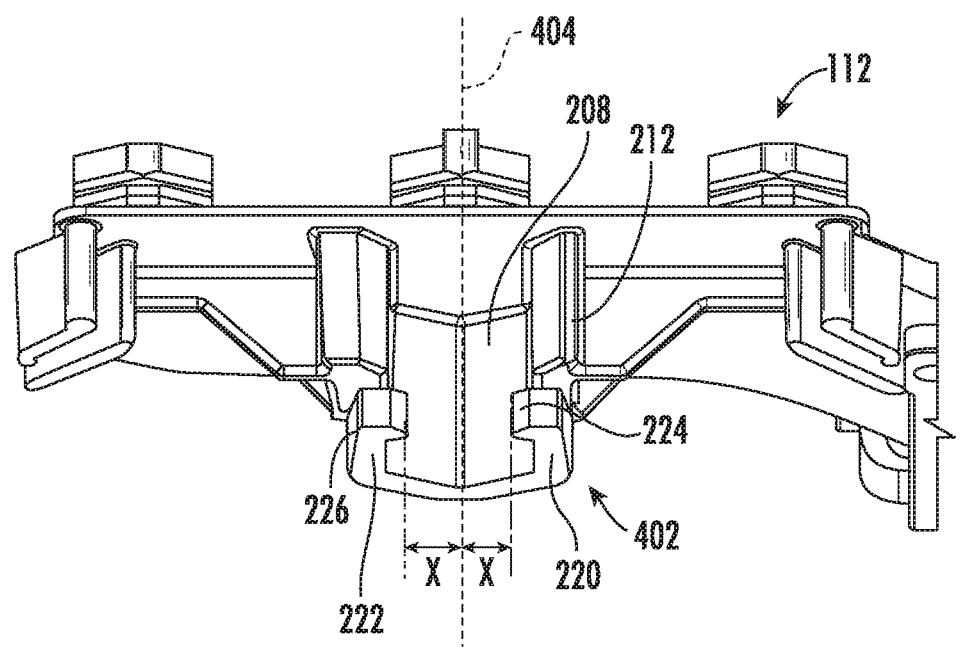
FIGS. 4A-4B illustrate perspective views of the axle retainer, in accordance with one or more embodiments of the present disclosure.
Figure 4B:
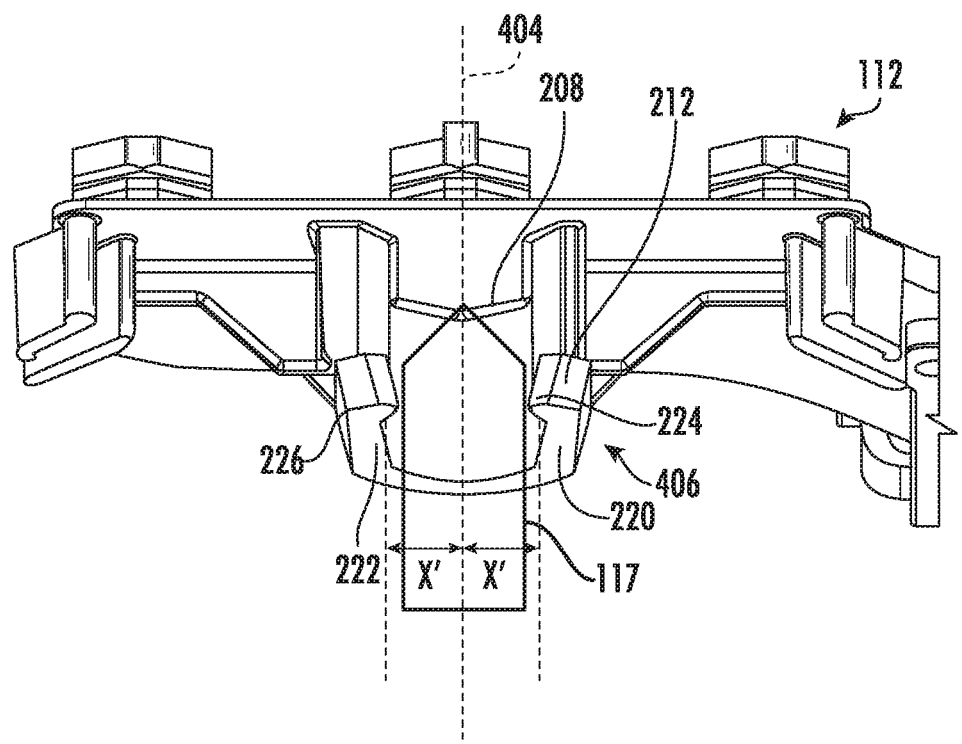

With reference to FIG. 4A a perspective view of the axle retainer 112 with the two arms 220, 222 in a first position 402, in accordance with one or more embodiments of the present disclosure is illustrated. In the first position 402, the two arms 220, 222 of the snap-fit bracket 212 of the axle retainer 112 are in the resting position. In the first position 402, the protrusions 224, 226 of the two arms 220, 222 are each located at a distance from an axis 404 that is located perpendicular through the center of the aperture 208. FIG. 4B illustrates a perspective view of the axle retainer 112 with the two arms 220, 222 in a second position 406, in accordance with one or more embodiments of the present disclosure. As shown in FIG. 4B, the axle retainer 112 is shown receiving a conveyor roller axle 117 within the aperture 208 of the axle retainer 112. Thus, the two arms 220, 222 expand from the first position 402 to the second position 406 to enable the conveyor roller axle 117 to be inserted into the aperture 208. In the second position 406, the two protrusions 224, 226 of the two arms 220, 222 expand to a distance x' from the axis 404, as shown in FIG. 4B. As shown, in some embodiments, the distance x' is greater than the distance x.

Figure 4C:
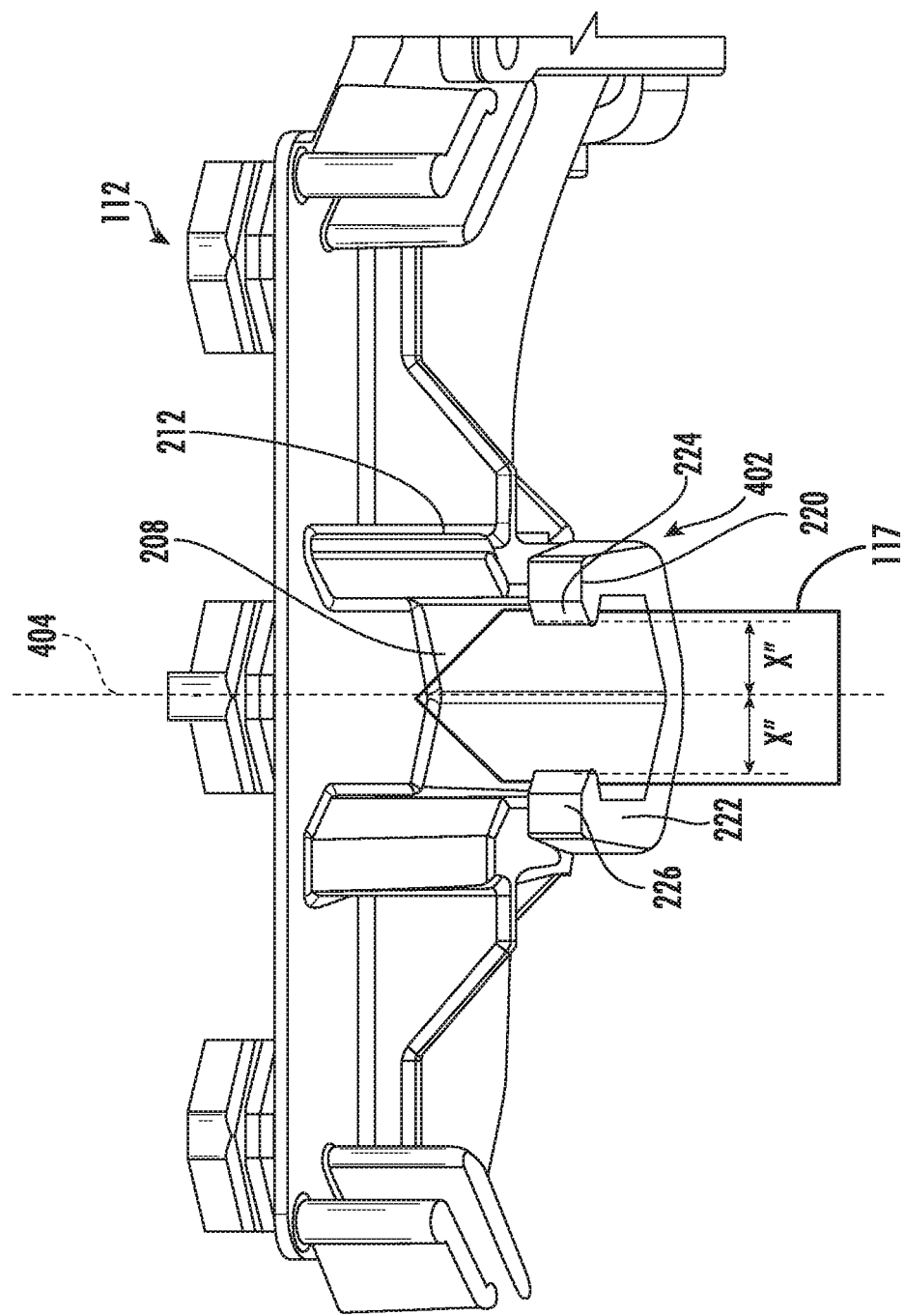
FIG. 4C illustrates a perspective view of the axle retainer with a mounted conveyor roller axle, in accordance with one or more embodiments of the present disclosure.

Further, with reference to FIG. 4C, a perspective view of the axle retainer 112 with the conveyor roller axle 117 secured to the axle retainer 112, in accordance with one or more embodiments of the present disclosure is illustrated. As shown in FIG. 4C, once the conveyor roller axle 117 is inserted into the aperture 208 of the axle retainer 112, the two arms 220, 222 may rebut from the second position 406 to the first position 402. The protrusions 224, 226 of the two arms 220, 222 may be configured to support or otherwise hold the conveyor roller axle 117 to retain the conveyor roller axle 117 within the aperture 208, as shown in FIG. 4C. Further, with the conveyor roller axle 117 mounted to the axle retainer 112, the distance of the two protrusions 224, 226 from the axis 404 may be x", as shown in FIG. 4C. In accordance with the embodiments of the present disclosure, the distance x" may be equal to or greater than the distance x, but less than the distance x'. That is, when a width of the conveyor roller axle 117 is less than or equal to a width of the aperture 208, the distance x" may be equal to the distance x, as described above. Further, when the width of the conveyor roller axle 117 is slightly greater than the width of the aperture 208, the distance x" may be greater than the distance x. However, in both cases, the distance x" will be lesser than the distance x'.

Thus, as described above, the two arms 220, 222 may expand from the first position 402 to the second position 406 within the aperture 208 to receive the conveyor roller axle 117 and rebut from the second position 406 to the first position 402 such that the protrusions 224, 226 defined by the two arms 220, 222 of the snap-fit bracket 212 retain the conveyor roller axle 117 in the aperture 208. Further, the two arms 220, 222 may expand from the first position 402 to the second position 406 within the aperture 208 for dismounting the conveyor roller axle 117 from the aperture 208, and rebut to the first position 402 from the second position 406 in an instance in which the conveyor roller axle 117 is dismounted from the aperture 208.

It must be noted that, as used in this specification above and the appended claims, the singular forms "a," "an" and "the" include plural referents unless the content clearly dictates otherwise.

References within the specification above to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An axle retainer comprising a housing, the housing comprising:
    a first surface configured to be secured to an inner-sidewall of a conveyor frame, wherein the first surface comprises:
        a locking hook on the first surface of the housing, wherein the locking hook is configured to be mounted on a groove seat at the inner-sidewall of the conveyor frame, and
        an inverted hook on the first surface of the housing, wherein the inverted hook is configured to be inserted within a hook groove at the inner-sidewall of the conveyor frame, and wherein the inverted hook is inserted within the hook groove such that a pair of flaps of the inverted hooks rest against an outer-sidewall of the conveyor frame; and
    a second surface opposite the first surface, wherein the second surface defines:
        an aperture configured to mount a conveyor roller axle therein, wherein the aperture comprises:
            a snap-fit bracket comprising two arms each with a corresponding protrusion, wherein each arm of the two arms of the snap-fit bracket are configured to:
                expand from a first position to a second position within the aperture to receive the conveyor roller axle, and
                rebut from the second position to the first position such that the pair of corresponding protrusions defined by the two arms of the snap-fit bracket retain the conveyor roller axle in the aperture.

2. The axle retainer of claim 1, wherein the first surface of the axle retainer is configured to be clamped between two ends of adjacent conveyor zones defined by one or more frame-walls of a conveyor frame.

3. The axle retainer of claim 1, wherein each arm of the two arms of the snap fit bracket are further configured to:
    expand from the first position to the second position within the aperture for dismounting the conveyor roller axle from the aperture; and
    rebut to the first position from the second position in an instance in which the conveyor roller axle is dismounted from the aperture.

4. The axle retainer of claim 1, wherein the second surface of the housing further comprises at least one channel for receiving a transition plate.

5. The axle retainer of claim 1, wherein the aperture comprises a supporting arm configured to support the conveyor roller axle mounted in the aperture.

6. The axle retainer of claim 3, wherein the inverted hook includes a protrusion or the pair of flaps extending away from each other.

7. The axle retainer of claim 1, wherein the locking hook on the first surface of the housing includes a hex shaped protrusion to receive the complementary shaped groove seat.

8. A conveyor system with one or more axle retainers comprising:
    a conveyor frame defining a first frame-wall and a second frame-wall; and
    the one or more axle retainers secured to an inner sidewall of the first frame-wall and the second frame-wall, the one or more axle retainers defined by a housing comprising:
        a first surface configured to be secured to the inner-side wall of the first frame-wall and the second frame-wall, wherein the first surface comprises:
            a locking hook on the first surface of the housing, wherein the locking hook is configured to be mounted on a groove seat at the inner-sidewall of the first frame-wall and the second frame-wall, and
            an inverted hook on the first surface of the housing, wherein the inverted hook is configured to be inserted within a hook groove at the inner-sidewall of the first frame-wall and the second frame-wall, and wherein the inverted hook is inserted within the hook groove such that a pair of flaps of the inverted hooks rest against an outer-sidewall of the first frame-wall and the second frame-wall;
        an aperture configured to mount a conveyor roller axle therein, wherein the aperture comprises:
            a snap-fit bracket comprising two arms each with a corresponding protrusion, wherein each arm of the two arms of the snap-fit bracket are configured to:
                expand from a first position to a second position within the aperture to receive the conveyor roller axle, and
                rebut from the second position to the first position such that the pair of corresponding protrusions defined by the two arms of the snap-fit bracket retain the conveyor roller axle in the aperture.

9. The conveyor system of claim 8, wherein the conveyor frame is divided into a plurality of conveyor zones, wherein each conveyor zone comprises a set of conveyor rollers mounted between the first frame-wall and the second frame-wall of the conveyor frame and, wherein a conveyor belt is reeved over the set of conveyor rollers.

10. The conveyor system of claim 9, wherein at least one of the one or more axle retainers is clamped between two ends of adjacent conveyor zones on the first frame-wall or the second frame-wall of the conveyor frame.

11. The conveyor system of claim 8, wherein at least one of the first frame-wall and the second frame-wall of the conveyor frame comprises the groove seat configured to engage with the locking hook of the one or more axle retainers for securing the one or more axle retainers on the first frame wall or the second frame-wall, respectively.

12. The axle retainer of claim 11, wherein the flaps are made of a flexible material.

13. The conveyor system of claim 8, wherein at least one of the first frame-wall and the second frame-wall of the conveyor frame comprises the hook groove configured to receive the inverted hook of the one or more axle retainers for securing the one or more axle retainers on the first frame-wall or the second frame wall, respectively.

14. A method of coupling a conveyor roller axle to a conveyor frame, the method comprising:
   securing, a first surface of an axle retainer to an inner-sidewall of the conveyor frame, wherein the axle retainer includes a second surface opposite to the first surface, wherein the first surface comprises:
      a locking hook on the first surface of the housing, wherein the locking hook is configured to be mounted on a groove seat at the inner-sidewall of the conveyor frame, and
      an inverted hook on the first surface of the housing, wherein the inverted hook is configured to be inserted within a hook groove at the inner-sidewall of the conveyor frame, and wherein the inverted hook is inserted within the hook groove such that a pair of flaps of the inverted hooks rest against an outer-sidewall of the conveyor frame; and
   mounting, the conveyor roller axle to an aperture of the second surface, wherein the aperture includes a snap-fit bracket comprising two arms each with a corresponding protrusion, the mounting comprises:
      expanding, of the two arms, from a first position to a second position within the aperture to receive the conveyor roller axle, and
      rebutting, of the two arms, from the second position to the first position such that the pair of corresponding protrusions defined by the two arms of the snap-fit bracket retain the conveyor roller axle in the aperture.

15. The method of claim 14, further comprising clamping the first surface between two ends of adjacent conveyor zones defined by one or more frame-walls of the conveyor frame.

16. The method of claim 14, further comprising the second surface of the axle retainer comprising of at least one channel for receiving a transition plate.

17. The method of claim 14, further comprising the locking hook on the first surface of the housing includes a hex shaped protrusion to receive the complementary shaped groove seat.

18. The method of claim 14, further comprising the transition plate covering the open spaces between the axle retainer and the conveyor frame.

* * * * *